(12) United States Patent
Krittian et al.

(10) Patent No.: US 9,334,939 B2
(45) Date of Patent: May 10, 2016

(54) POWER SPLIT TRANSMISSION OF A TRACTION DRIVE OF A VEHICLE

(71) Applicant: Linde Hydraulics GmbH & Co. KG, Aschaffenburg (DE)

(72) Inventors: Lukas Krittian, Aschaffenburg (DE); Martin Bergmann, Schaafheim (DE); Alfred Langen, Aschaffenburg (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 57 days.

(21) Appl. No.: 14/100,085

(22) Filed: Dec. 9, 2013

(65) Prior Publication Data
US 2014/0221146 A1 Aug. 7, 2014

(30) Foreign Application Priority Data

Dec. 17, 2012 (DE) .......................... 10 2012 112 380
Sep. 23, 2013 (DE) .......................... 10 2013 110 463

(51) Int. Cl.
| | | |
|---|---|---|
| *F16H 47/04* | (2006.01) | |
| *F16H 61/42* | (2010.01) | |
| F16H 3/72 | (2006.01) | |
| F16H 37/08 | (2006.01) | |

(52) U.S. Cl.
CPC ................ *F16H 47/04* (2013.01); *F16H 61/42* (2013.01); *F16H 3/727* (2013.01); *F16H 2037/088* (2013.01); *F16H 2037/0893* (2013.01); *F16H 2200/2005* (2013.01)

(58) Field of Classification Search
CPC ............................................. F16H 2037/0893
See application file for complete search history.

(56) References Cited

U.S. PATENT DOCUMENTS

| | | | |
|---|---|---|---|
| 3,748,924 A | | 7/1973 | Cross et al. |
| 4,259,881 A | | 4/1981 | Meyerle |
| 4,382,392 A | * | 5/1983 | Meyerle ................. B60K 17/10 475/81 |
| 5,667,452 A | * | 9/1997 | Coutant .......................... 475/81 |
| 6,852,056 B2 | * | 2/2005 | Weeramantry .......... F16H 47/04 475/73 |
| 7,357,744 B2 | * | 4/2008 | Dyck ...................... B62D 11/18 475/21 |
| 2004/0124021 A1 | | 7/2004 | Shirai et al. |
| 2008/0081724 A1 | * | 4/2008 | Ivantysynova et al. ....... 475/129 |
| 2008/0155974 A1 | | 7/2008 | Aitzetmueller et al. |
| 2009/0036248 A1 | | 2/2009 | Mueller et al. |
| 2009/0055061 A1 | * | 2/2009 | Zhu ................................ 701/55 |
| 2011/0015022 A1 | * | 1/2011 | Stoeckl .................. B60K 6/442 475/83 |
| 2012/0152056 A1 | * | 6/2012 | Du et al. ...................... 74/731.1 |

FOREIGN PATENT DOCUMENTS

| | | |
|---|---|---|
| DE | 19843069 A1 | 5/1999 |
| DE | 19841829 A1 | 3/2000 |

(Continued)

*Primary Examiner* — Ramya Burgess
*Assistant Examiner* — Lillian Nguyen
(74) *Attorney, Agent, or Firm* — The Webb Law Firm (57) ABSTRACT

A power split transmission (LG) of vehicle a traction drive (F) includes a continuously variable transmission (G) and a summing transmission (SG). The continuously variable transmission (G) has a primary unit (P) and a secondary unit (S) driven by the primary unit (P). The primary unit (P) has a driveshaft (TW1) connected, directly and without the interposition of a clutch device, with the sun gear (SR) of the summing transmission (SG). The secondary unit (S) has a driveshaft (TW2) connected, without the interposition of a clutch device, with a ring gear (HR) or a planetary carrier (PT) of the summing transmission (SG). The planetary carrier (PT) or the ring gear (HR) of the summing transmission (SG) form an output element of the summing transmission (SG), which is in a driving connection with the wheel drive.

17 Claims, 5 Drawing Sheets

(56) References Cited

FOREIGN PATENT DOCUMENTS

| | | | |
|---|---|---|---|
| DE | 10248400 A1 | 4/2004 | |
| DE | 102013111907 A1 * | 6/2014 | ............. F16H 47/04 |
| EP | 1855029 A2 | 11/2007 | |
| EP | 2034221 A2 | 3/2009 | |
| FR | 1231667 A | 9/1960 | |
| GB | 914314 | 1/1963 | |
| WO | 2007104539 A1 | 9/2007 | |

* cited by examiner

POWER SPLIT TRANSMISSION OF A TRACTION DRIVE OF A VEHICLE

CROSS REFERENCE TO RELATED APPLICATION

This application claims priority to German Application Nos. DE 102012112380.2 filed Dec. 17, 2012 and DE 102013110463.0 filed Sep. 23, 2013, which are both herein incorporated by reference in their entirety.

BACKGROUND OF THE INVENTION

1. Field of the Invention

This invention relates to a power split transmission of a traction drive of a vehicle, the power split transmission having a continuously variable transmission and a summing transmission. The continuously variable transmission has a primary unit and a secondary unit driven by the primary unit in both directions of rotation. The primary unit of the continuously variable transmission is driven by a drive motor, such as an internal combustion engine, of the vehicle. The primary unit is connected to a first drive element of the summing transmission, which summing transmission is in the form of a planetary transmission. The secondary unit of the continuously variable transmission is connected to a second drive element of the summing transmission. An output element of the summing transmission is in a driving connection with a wheel drive.

2. Description of Related Art

To comply with increasingly stringent exhaust standards and regulations, traction drives with power split transmissions that have a continuously variable gear ratio are being used to an increasing extent. Power split transmissions with a continuously variable gear ratio make it possible to achieve optimum efficiency in all operating ranges of the vehicle, which makes possible the more fuel-efficient operation of the drive motor of the vehicle, typically an internal combustion engine.

A traction drive with a power split transmission is described in EP 2 034 221 A2. Known power split transmissions have switchable clutch devices, such as wet multiple plate clutches or friction clutches, which co-rotate continuously during the operation of the power split transmission. The co-rotating clutch devices, on account of churning losses, reduce the efficiency of the traction drive. On account of an increased number of components, existing clutch devices of the power split transmission also require additional construction space and additional manufacturing effort and expense and increase the weight of the power split transmission.

Therefore, it is an object of this invention to provide a power split transmission of the general type described above but which represents an improvement in terms of its compact size, lighter weight, and greater efficiency.

SUMMARY OF THE INVENTION

The invention teaches that the primary unit of the continuously variable transmission has a driveshaft which is in a driving connection directly, i.e., without the interposition of a clutch device, with the sun gear of the summing transmission. The secondary unit of the continuously variable transmission has a driveshaft which is in a driving connection directly, i.e., without the interposition of the clutch device, with a ring gear or a planetary carrier of the summing transmission. The planetary carrier or the ring gear of the summing transmission form an output element of the summing transmission, which is in a driving connection with the wheel drive. Thus, the power split transmission of the invention includes a summing transmission but without the need for engaging or disengaging (switchable) clutch devices. The drive of the sun gear of the summing transmission by the drive motor via the primary unit as a mechanical branch of the power split transmission makes it possible, by a superimposition of the speed of rotation on the second drive element via the continuously variable transmission, to cover the entire speed range of the vehicle for reverse travel and forward travel without clutch devices in the summing transmission. The elimination of clutch devices in the power split transmission of the invention leads to lower construction costs, a more compact size, and a lighter weight of the power split transmission. The power split transmission of the invention also has low churning losses, as a result of which the power split transmission of the invention has a higher efficiency than such devices that include clutches.

In one preferred embodiment of the invention, the driveshaft of the primary unit is connected on the input side directly, or with the interposition of a spur gear transmission stage, with an output shaft of the drive motor. With a direct drive of the primary unit by the output shaft of the drive motor, a coaxial construction of the drive motor and of the power split transmission can be achieved, which makes possible, for the drivetrain formed by the drive motor and the power split transmission, a more compact construction in the radial direction. When the primary unit is driven by a spur gear transmission stage, it becomes possible to orient the power split transmission axially parallel to the drive motor within its axial extension, so that for the drivetrain formed by the drive motor and the power split transmission, a more compact construction in the axial direction becomes possible.

With regard to more compact construction and lower construction costs, it is advantageous if, as in one embodiment of the invention, the secondary unit and the summing transmission are oriented coaxially with the primary unit, with the secondary unit located between the primary unit and the summing transmission. This coaxial location of the secondary unit directly behind the primary unit makes it possible to construct the primary unit and the secondary unit of the continuously variable transmission in the form of a compact transmission. The summing transmission is located directly behind the secondary unit. With a coaxial arrangement of the primary unit, the secondary unit, and the summing transmission, it is also possible to achieve a compact construction of the power split transmission in the radial direction.

With the coaxial arrangement of the secondary unit as described above and located between the primary unit and the summing transmission, the driveshaft of the secondary unit can be advantageously in the form of a hollow shaft, through which the driveshaft of the primary unit extends. The driveshaft of the primary unit, which is connected with the sun gear of the summing transmission, can easily run through the hollow shaft of the secondary unit to the summing transmission, which is located behind the secondary unit. The driveshaft of the primary unit on the power split transmission of the invention can therefore be in the form of a solid shaft, which makes it possible to transmit a high torque from the drive motor to the sun gear via the mechanical branch.

In one advantageous embodiment of the invention, the driveshaft of the secondary unit is in a driving connection directly with the ring gear or the planetary carrier of the summing transmission.

In an alternative embodiment of the invention, the summing transmission is oriented coaxially with the primary unit, and the secondary unit is oriented axially parallel to the primary unit. With an orientation of the secondary unit axially parallel to the primary unit and the summing transmission, a construction of the power split transmission with a short axial construction length becomes possible, because the primary unit and the secondary unit which is offset axially parallel from it can be overlapped in the axial direction.

It is particularly advantageous with an arrangement of the secondary unit as described above if the driving shaft of the secondary unit is in a driving connection with the ring gear or the planetary carrier of the summing transmission with the interposition of a spur gear transmission stage. By means of the translation ratio of the spur gear transmission stage, it is also possible to vary the spread of the power split transmission or to influence the ratio of the power splits transmitted in the mechanical branch or in the branch via the continuously variable transmission.

In one embodiment of the invention, the wheel drive can be a drive axle of a multi-track vehicle, with the output element of the summing transmission in a driving connection with the differential transmission of the drive axle.

It is particularly advantageous if, as in one alternative embodiment of the invention, the wheel drive is an individual wheel drive of a motorcycle whose wheels are arranged in a single plane one behind the other. The output element of the summing transmission is in a driving connection with a bevel gear of a bevel gear transmission that drives the single wheel, or is in a driving connection with a chain wheel of a chain transmission that drives the single wheel. On account of its compact construction and light weight, the power split transmission of the invention can be advantageously installed on a motorcycle.

In one embodiment of the invention, the continuously variable transmission is an electric transmission, in which case the primary unit is the electric generator and the secondary unit is an electric motor.

Alternatively, the continuously variable transmission can be a mechanical continuously variable transmission (CVT), such as a chain or belt drive transmission or a friction gear or cone ring transmission. A continuously variable chain or belt drive transmission has pairs of V-pulleys as the drive-side primary unit and the output-side secondary unit, respectively, between which a chain or belt is located, such as a V-belt, a steel thrust belt, a flexible cleat chain, or a flat link articulated chain. On at least one V-pulley, one pulley flange can be adjusted axially with respect to the second pulley flange. A continuously variable friction gear has a primary pulley as the drive-side primary unit, and a secondary pulley as the output-side secondary unit, between which at least one adjustable friction wheel is located. On a friction gear, models with a cylindrical, planar, conical or toroidal construction are possible. A continuously variable cone ring transmission has a primary cone as the drive-side primary unit and a secondary cone as the output-side secondary unit, between which a variable-position friction ring is adjustably located.

In one alternative embodiment of the invention, the continuously variable transmission is in the form of a hydrostatic transmission, in which the primary unit is a variable displacement pump and the secondary unit is a hydraulic motor connected in a closed circuit.

The variable displacement pump is particularly advantageously a bi-directionally adjustable variable displacement pump. In this configuration, it becomes possible in a simple manner to operate the hydraulic motor, which is connected in the closed circuit to the variable displacement pump, in both directions of rotation, so that by means of the hydrostatic branch of the power split transmission and the speed of rotation, as well as the two directional rotation of the drive element of the planetary gear driven by the hydraulic motor, it becomes possible to reproduce the entire speed range for reverse travel and forward travel of the vehicle.

The hydraulic motor can be a constant displacement motor. Alternatively, the hydraulic motor can be a variable-displacement motor. It thereby becomes possible in a simple manner to shift the speed range of the drive element of the summing transmission driven by the hydraulic motor upwardly to achieve higher speeds of travel of the vehicle.

If the variable displacement pump and the hydraulic motor are designed with a coaxial arrangement in the form of a compact transmission in a coaxial back-to-back construction, there are additional advantages with regard to the size and cost of the unit. With a back-to-back construction of the variable displacement pump and the hydraulic motor, a common control plate can be used for the variable displacement pump and the hydraulic motor, through which the hydraulic lines between the variable displacement pump and the hydraulic motor are routed.

The invention further relates to a method of operation of a power split transmission of a traction drive of a vehicle, in which the power split transmission comprises a continuously variable hydrostatic transmission and a summing transmission. The primary unit of the continuously variable transmission is a bi-directionally adjustable variable displacement pump and is driven by the drive motor, such as an internal combustion engine, and the variable displacement pump drives the sun gear of the summing transmission, which is a planetary transmission. The secondary unit of the continuously variable transmission is formed by a hydraulic motor and drives the ring gear of the summing transmission. The planetary carrier forms the output element of the summing transmission. In the power split transmission of the invention, to bring the vehicle to a stop when the drive motor is running, the variable displacement pump is actuated in a first control direction in which the hydraulic motor is driven in a reverse direction of rotation, so that the ring gear driven by the hydraulic motor has a direction of rotation which is opposite to that of the sun gear, and the peripheral speed of the sun gear and the peripheral speed of the ring gear driven by the hydraulic motor are equal. On the power split transmission of the invention, by means of a corresponding shifting of the variable displacement pump in a first control direction, the ring gear (which is driven by the hydraulic motor) can in a simple manner be driven in the opposite direction of rotation to that of the sun gear driven by the drive motor, and the peripheral speed of the ring gear rotating opposite to the sun gear is equal to the peripheral speed of the sun gear. In this case (vehicle stationary setting), the planetary gears of the summing transmission rotate around their own axis of rotation without driving the planetary carrier, so that the vehicle is stopped while the drive motor is running.

The setting of the vehicle to a stop by a corresponding adjustment of the variable displacement pump in a first control direction makes it possible to achieve a reverse direction of travel of the vehicle. For a reverse direction of travel of the vehicle, the displacement of the variable displacement pump is increased, starting from the setting corresponding to the vehicle being at a standstill (vehicle stationary setting), in the first control direction so that the peripheral speed of the ring gear driven opposite to the sun gear is greater in terms of absolute value than the peripheral speed of the sun gear. The increase of the displacement of the variable displacement pump in the first control direction thereby leads to an increase of the peripheral speed of the ring gear driven by the hydraulic motor opposite to the sun gear, so that by increasing the displacement of the variable displacement pump in the first control direction, the vehicle is started in the reverse direction of travel and the speed of travel in the reverse direction is increased. As a result of the adjustment range of the variable displacement pump in the first control direction between the setting for vehicle standstill and the maximum displacement in the first control direction, it is possible in a simple manner to cover the speed range of the vehicle for reverse travel.

The setting of the vehicle to a stop by a corresponding adjustment of the variable displacement pump in a first control direction also makes it possible to achieve forward travel of the vehicle. This is accomplished by adjusting the setting of the variable displacement pump, starting from the setting for the vehicle being stopped (vehicle stationary setting), toward a null position, so that the peripheral speed of the ring gear is reduced. Then, the variable displacement pump is adjusted in a second (opposite) control direction in which the hydraulic motor is driven in a forward direction of rotation, such that the ring gear driven by the hydraulic motor has a direction of rotation and peripheral speed that are the same as those of the sun gear. The reduction of the displacement of the variable displacement pump in the first control direction toward a null position therefore leads to a reduction of the peripheral speed of the ring gear driven by the sun gear, so that as a result of the reduction of the displacement of the variable displacement pump toward the null position, the vehicle is started in the forward direction and the speed of travel in the forward direction of travel is increased. In the null position of the variable displacement pump, the hydraulic motor is not driven and is supported (braked) by the variable displacement pump so that the ring gear is not driven. The sun gear is driven at the speed of rotation of the drive motor. In the null position of the variable displacement pump, the power, except for the minor volumetric losses due to the pressure resulting from the supporting (braking) action of the hydrostatic transmission (which is in the form of a closed circuit), is transmitted purely mechanically. At a given drive speed of rotation of the drive motor that drives the sun gear, a corresponding output speed of rotation is set on the planetary carrier, so that the vehicle is operated at a specified speed in the forward direction of travel. As a result of a shifting of the variable displacement pump in the second, opposite, control direction, in which the hydraulic motor is driven in a forward direction of rotation, and in which the ring gear driven by the hydraulic motor has a direction of rotation which is the same as that of the sun gear, a peripheral speed of the ring gear (which increases with the shifting of the variable displacement pump) and thus the output speed of the planetary carrier are increased. By increasing the displacement of the variable displacement pump in the second control direction, a further increase of the speed of travel of the vehicle in the forward direction of travel is achieved. As a result of the range of adjustment of the variable displacement pump in the first control direction between the setting at which the vehicle is stopped and the null position, as well as the full range of adjustment in the opposite, second, control direction, it is possible in a simple manner to cover the speed range of the vehicle for forward travel.

Additional advantages and details of the invention are explained in greater detail below with reference to the exemplary embodiments which are illustrated in the accompanying schematic figures, in which like reference numbers identify like parts throughout.

DESCRIPTION OF THE PREFERRED EMBODIMENTS

Figure 1:
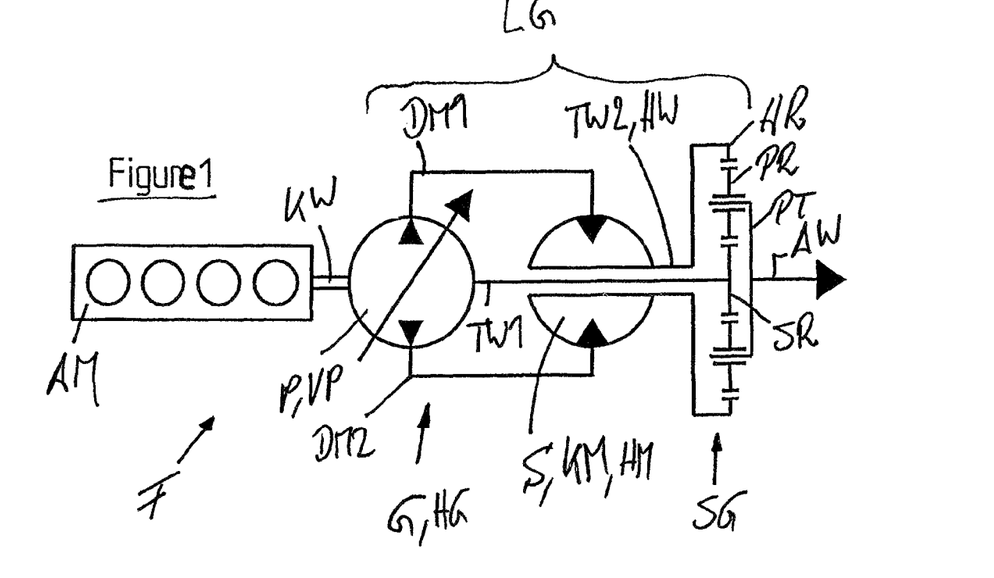
FIG. 1 shows a first embodiment of a power split transmission of the invention.

FIG. 1 shows a traction drive F of a vehicle with a power split transmission LG of the invention. The power split transmission LG is formed by a continuously variable transmission G and a summing transmission SG. The continuously variable transmission G has a primary unit P and a secondary unit S, which is driven by the primary unit P in both directions of rotation. The primary unit P of the continuously variable transmission G is in a driving connection on the input side by a drive motor AM of the vehicle which, in the illustrated exemplary embodiment, is an internal combustion engine, and is in a driving connection on the output side with the sun gear SR as the first drive element of the summing transmission SG, which summing transmission SG is in the form of a planetary transmission. The secondary unit S of the continuously variable transmission G is in a driving connection on the output side with a ring gear HR as the second drive element of the summing transmission SG. The planetary carrier PT, which preferably carries a plurality of planetary gears PR of the summing transmission SG (in the form of a planetary transmission) forms the output element of the planetary transmission and is in a driving connection by the driveshaft AW with a wheel drive (which is not illustrated in detail in FIG. 1).

The primary unit P of the continuously variable transmission G has a driveshaft TW1, which is in a driving connection on the output side, directly and without the interposition of a clutch device, with the sun gear SR of the summing transmission SG. On the input side, the driveshaft TW1 of the primary unit P is in a driving connection directly with an output shaft KW, for example, the crankshaft of the a drive motor AM, which is in the form of an internal combustion engine. The secondary unit S of the continuously variable transmission G has a driveshaft TW2 which is in a driving connection, directly and without the interposition of a clutch device, with the ring gear HR of the summing transmission SG.

In FIG. 1, the power split transmission LG formed by the continuously variable transmission G and the summing transmission SG is oriented coaxially with the output shaft AW of the drive motor AM. The primary unit P, the secondary unit S, and the summing transmission SG are also arranged coaxially, with the secondary unit S located between the primary unit P and the summing transmission SG and thus, in the axial direction behind, preferably immediately behind, the primary unit P. The primary unit P is located in the axial direction behind the drive motor AM.

The driveshaft TW2 of the secondary unit S located behind the primary unit P is a hollow shaft HW, through which the coaxially oriented driveshaft TW1 of the primary unit P, which is preferably a solid shaft, runs to the summing transmission SG, which is located behind the secondary unit S.

In the illustrated exemplary embodiment, the continuously variable transmission G is a hydrostatic transmission HG, in which the primary unit P is a continuously adjustable variable displacement pump VP and the secondary unit S is a constant displacement motor KM in the form of a hydraulic motor HM, which is connected in the closed circuit by hydraulic lines DM1 and DM2 with the variable displacement pump VP. The variable displacement pump VP can be shifted starting from the null position with a displacement volume of zero in both delivery directions.

The variable displacement pump VP and the hydraulic motor HM are preferably each in the form of axial piston machines that utilize a swashplate construction. The variable displacement pump VP and the hydraulic motor HM are also preferably directly adjacent to each other as a compact transmission in a back-to-back arrangement, in which the hydraulic inlets and the hydraulic outlets of the variable displacement pump VP and of the hydraulic motor HM are located adjacent to each other. As a result, the variable displacement pump VP and the hydraulic motor HM are provided with a common control plate, which makes short hydraulic connections possible. A back-to-back arrangement of the variable displacement pump VP and of the hydraulic motor HM also makes possible a compact construction of the continuously variable transmission G in the axial direction, as a result of which small dimensions of the power split transmission in the axial direction are achieved.

Figure 2:
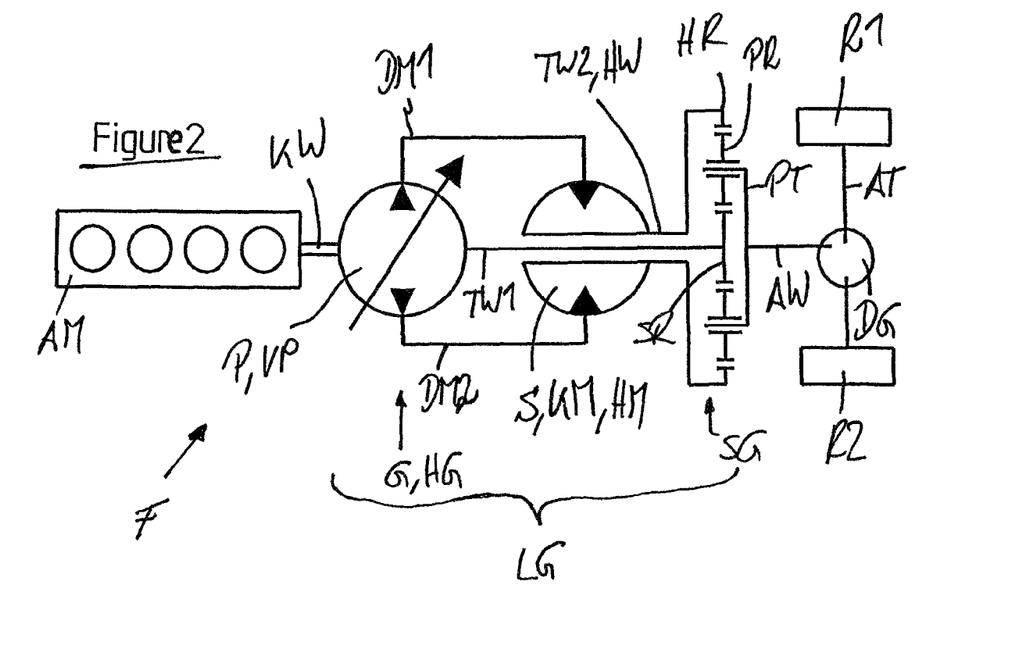
FIG. 2 shows a configuration of the power split transmission illustrated in FIG. 1.

FIG. 2 shows a traction drive F of a multi-track vehicle, such as a motor vehicle, with the power split transmission in FIG. 1 shown in greater detail. The output is formed by a drive axle AT, which is provided with two drive wheels R1, R2, and which has a differential transmission DG. The output shaft AW of the summing transmission SG is in this case in a driving connection with the differential transmission DG of the drive axle AT.

Figure 3:
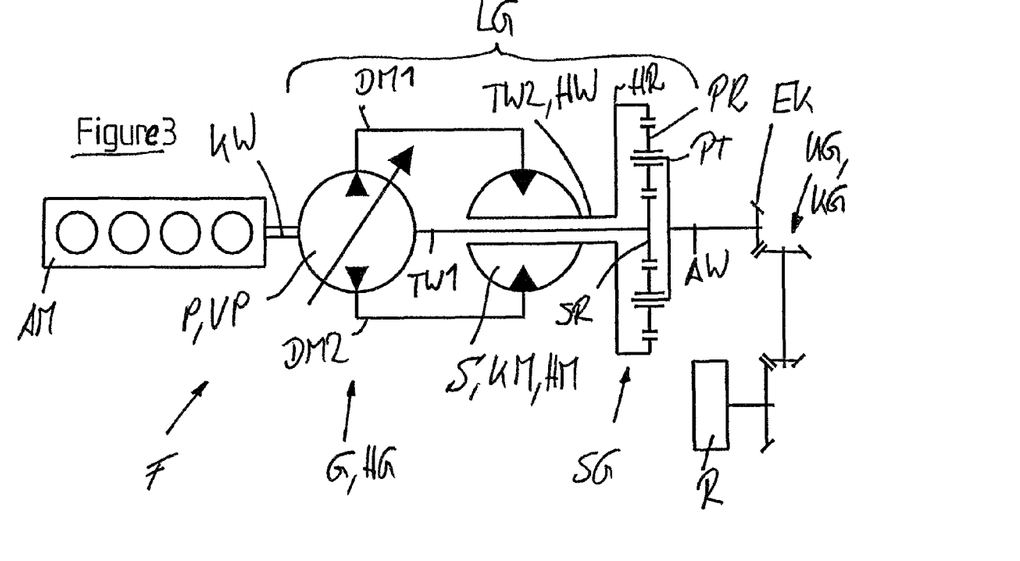
FIG. 3 shows an alternative configuration of the power split transmission illustrated in FIG. 1.

FIG. 3 shows a traction drive F of a single-track motorcycle with the power split transmission LG shown in FIG. 1 in greater detail. The output is formed by a single drive wheel R connected by a transfer transmission UG with the output shaft AW of the summing transmission SG. In the illustrated exemplary embodiment, the transfer transmission UG is a bevel gear transmission KG, with the output shaft AW of the summing transmission SG in a driving connection with an input bevel gear EK of the bevel gear transmission KG.

Figure 4:
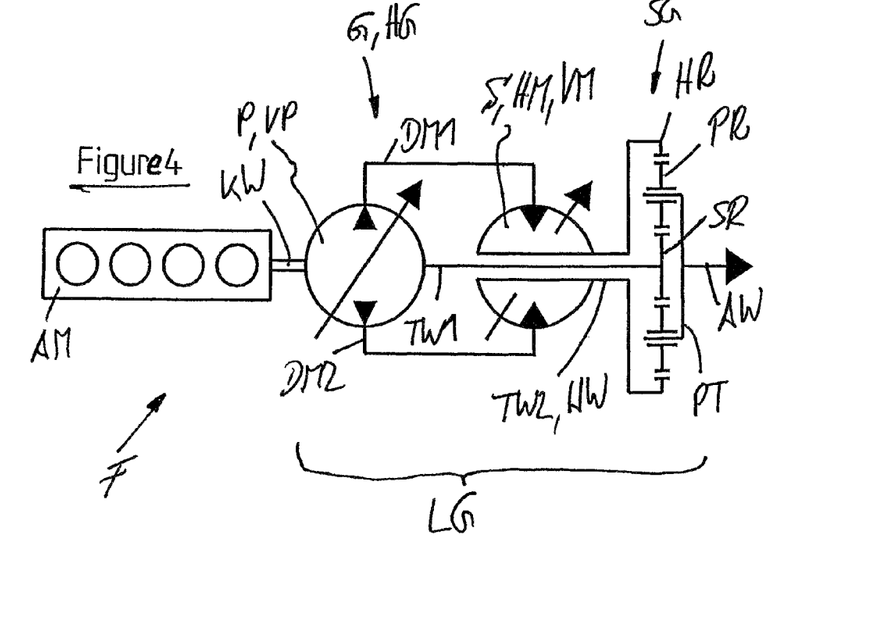
FIG. 4 shows a development of the power split transmission illustrated in FIG. 1.

FIG. 4 shows a power split transmission LG in which the secondary unit S, in the form of a hydraulic motor HM, of the continuously variable transmission G is a continuously variable displacement motor VM.

Figure 5:
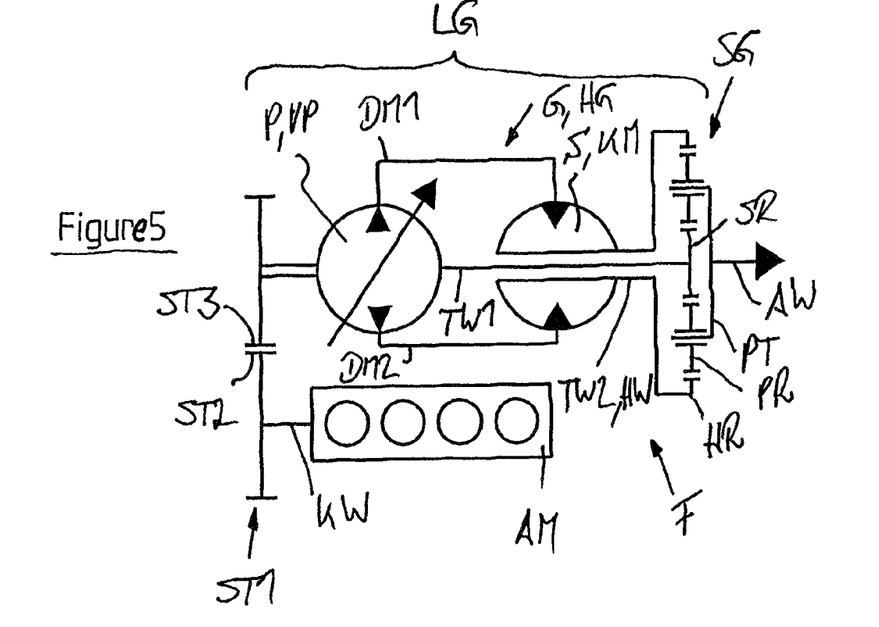
FIG. 5 shows an additional configuration of the power split transmission illustrated in FIG. 1.

FIG. 5 shows an embodiment of a traction drive F with a power split transmission LG illustrated in FIGS. 1-4 in which, instead of the coaxial arrangement of the power split transmission LG with the drive motor AW in which the driveshaft TW1 of the primary unit P of the continuously variable transmission G is in a direct driving connection with the output shaft KW of the drive motor AM as illustrated in FIGS. 1-4, the power split transmission LG is oriented axially parallel to the output shaft KW of the drive motor AM and the driveshaft TW1 of the primary unit P is in a driving connection with the interposition of a spur gear transmission stage ST1 with the output shaft KW of the drive motor AM. The spur gear transmission stage ST1 has a spur gear ST2 connected with the output shaft KW and a spur gear ST3 connected with the driveshaft TW1. The axially parallel orientation of the power split transmission LG makes possible an arrangement which is overlapped in the longitudinal direction, in which the power split transmission LG is located within the axial installed length of the drive motor AM.

Figure 6:
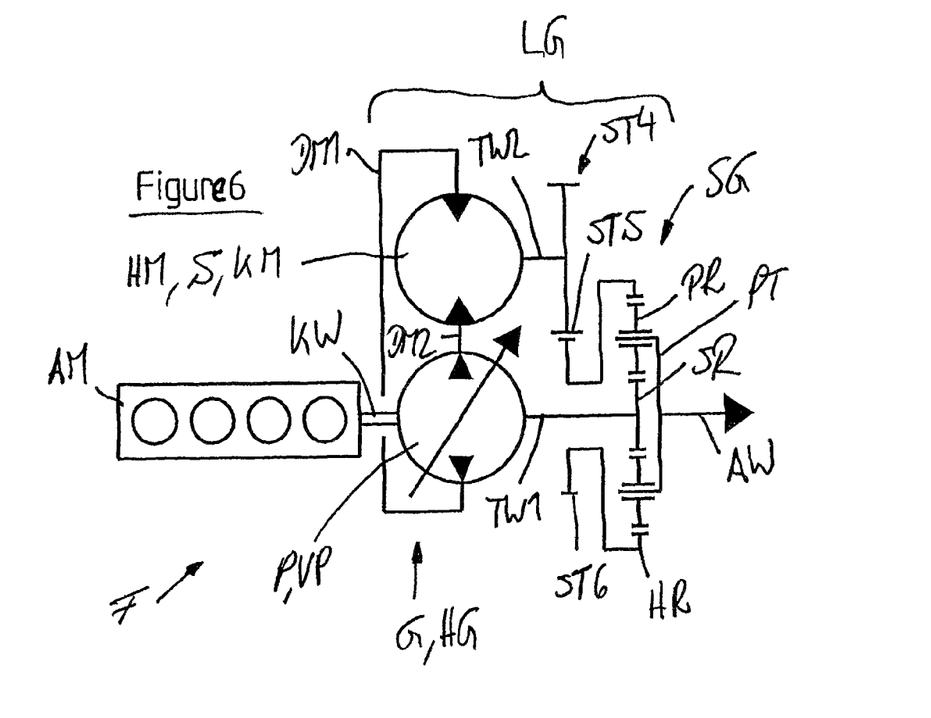
FIG. 6 shows an additional configuration of the invention.

FIG. 6 shows a configuration of the power split transmission LG in which, instead of the coaxial arrangement of the primary unit P and the secondary unit S of the continuously variable transmission G illustrated in FIGS. 1-5, the continuously variable transmission G is in a deconstructed form in which the secondary unit S is oriented axially parallel to the primary unit P. The driveshaft TW2 of the secondary unit S, which is oriented parallel to the driveshaft TW1 of the primary unit P, is in a driving connection with the interposition of a spur gear transmission stage ST4 with the ring gear HR of the summing transmission SG. The spur gear transmission stage ST4 has a spur gear ST5 located on the driveshaft TW2 of the secondary unit S and a spur gear ST6 molded onto the ring gear HR. The driveshaft TW2 of the secondary unit S is a solid shaft. The axially parallel arrangement of the primary unit P and the secondary unit S, by an overlapping of the primary unit P and the secondary unit S in the axial direction, makes possible a compact construction of the power split transmission LG with a short axial installed length.

In FIG. 6, the primary unit P and the summing transmission SG are oriented coaxially to the output shaft KW of the drive motor AM, with the driveshaft TW1 in a direct driving connection with the output shaft KW of the drive motor AM. It goes without saying that the deconstructed form of the continuously variable transmission G in FIG. 6 can be combined with an axially parallel arrangement of the power split transmission LG to the output shaft KW of the drive motor AM illustrated in FIG. 5, in which the driveshaft TW1 of the primary unit P is in a driving connection with the output shaft KW of the drive motor AM, with the interposition of a spur gear transmission stage ST1.

Figure 7:
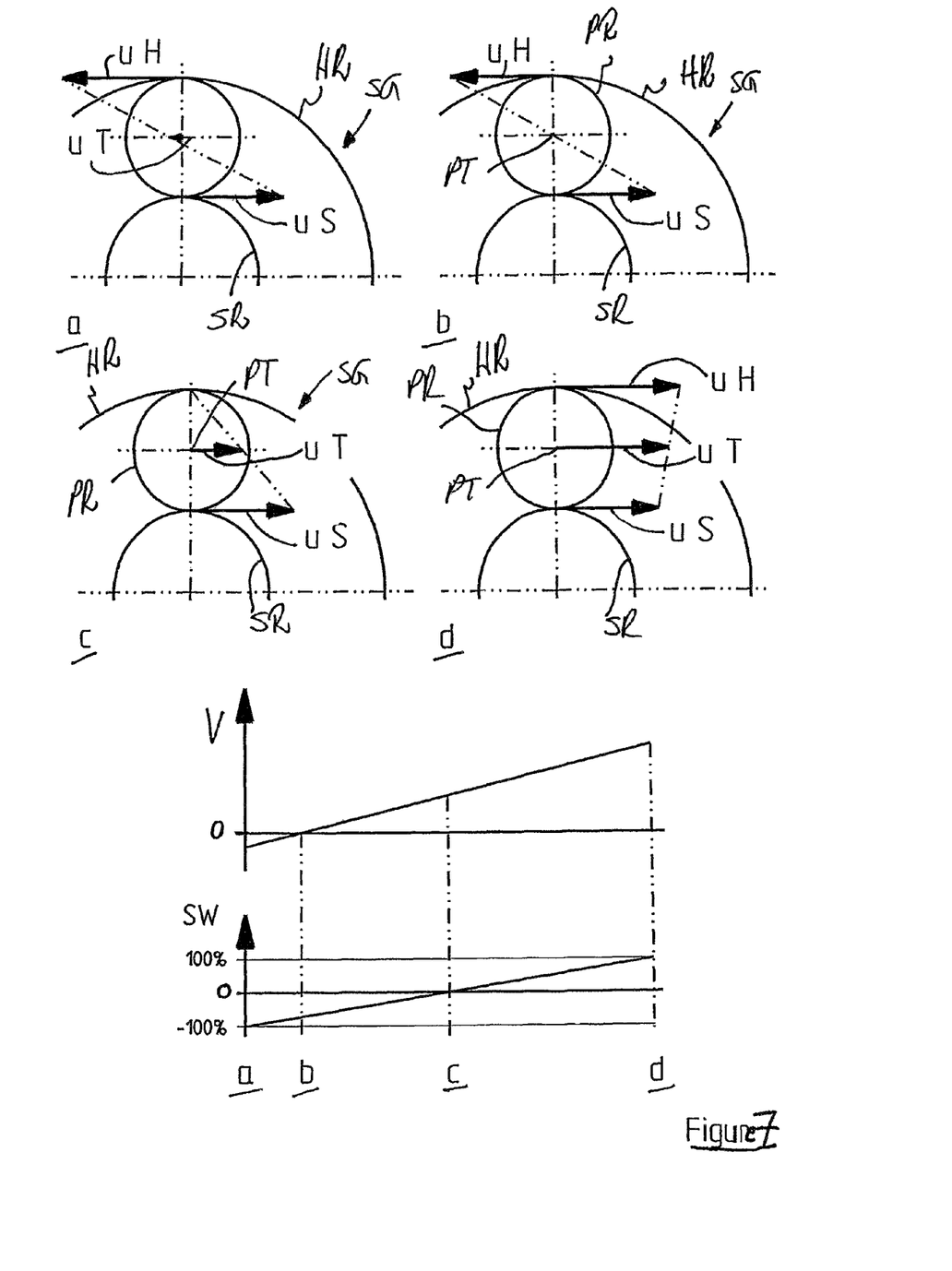
FIG. 7 shows different operating conditions of the power split transmission of the invention.

FIG. 7 illustrates, for a given and uniform drive speed of rotation of the drive motor AM, and thus an equal input speed of rotation of the sun gear SR of the summing transmission SG (which is driven by the drive motor AM by means of the driveshaft TW1 of the variable displacement pump VP), different operating conditions a, b, c, d of the power split transmission SG of the invention and illustrated in FIGS. 1-6.

For the operating conditions a, b, c, d, the upper portion of the diagram illustrates the speed of travel v of the vehicle and the lower portion illustrates the adjustment SW of the variable displacement pump VP in the two control directions, starting from a null position 0. With a variable displacement pump VP in the form of an axial piston machine that employs a swashplate design, the adjustment SW equals the pivoting angle of a swashplate that can pivot in both directions and generates a stroke.

The illustrations in the upper portion of FIG. 7 show a detail of the summing transmission SG for the operating conditions a, b, c, d. The peripheral speed of the sun gear SR resulting from the steady speed of rotation of the drive motor AM is identified as uS in the figures. In the illustrations, uH is the peripheral speed of the ring gear HR driven by the hydraulic motor HM, the magnitude and direction of which can be varied by a corresponding variation of the setting of the variable displacement pump VP. In the illustrations, uT is the resulting peripheral speed of the planetary carrier PT, which forms the output element of the summing transmission SG.

Condition "a" corresponds to a condition for the reverse travel of the vehicle. The variable displacement pump VP is adjusted in a first control direction in which the hydraulic motor HM is driven in the reverse direction and the ring gear HR is driven in the direction of rotation opposite to the direction of rotation of the sun gear SR driven by the hydraulic motor AM. In condition "a", the variable displacement pump VP is adjusted to the maximum extent in the first control direction, so that on the ring gear HR (which is driven by the hydraulic motor HM), a peripheral speed uH that is in the opposite direction to the peripheral speed uS of the sun gear SR is set, the magnitude of which is slightly greater than the peripheral speed uS of the sun gear SR. That results in a low peripheral speed uT on the planetary carrier PT and a resulting output speed of rotation of the planetary carrier PT with which the traction behavior of a vehicle, such as a motor vehicle or a motorcycle, in reverse gear can be simulated.

Condition "b" represents the power split transmission LG for a vehicle which is stopped, i.e., with a speed of travel 0. The peripheral speed uH of the ring gear HR driven by the hydraulic motor HM is set so that the peripheral speed uH of the ring gear HR offsets the peripheral speed uS of the sun gear SR, although it is of the same magnitude as the peripheral speed uS of the sun gear SR. As a result, the planetary gears PR rotate around their own axes without driving the planetary carrier PT. As illustrated in the control diagram of the variable displacement pump VP, for this operating condition "b", the adjustment SW of the variable displacement pump VP in the first control direction is less by a certain amount than in the operating condition "a", and the adjustment SW of the variable displacement pump in the first control direction is less than in the operating condition "a" in the direction of the null position 0.

As illustrated in the control diagram of the variable displacement pump VP, starting from the position in which the vehicle is stopped (operating condition "b"), by increasing the adjustment SW toward the first control direction, the vehicle is accelerated in the reverse direction of travel, and thus reverse travel can be achieved. Accordingly, by reducing the adjustment SW in the first control direction, the vehicle is accelerated in the forward direction of travel and thus forward travel can be achieved.

In operating condition "c", the variable displacement pump VP is in the null position 0, in which the hydraulic motor HM is not driven and the motor HM is supported (braked) via the closed circuit of the hydrostatic transmission HG by the variable displacement pump VP. In operating condition "c", the ring gear HR is standing still and the sun gear SR is driven by the driveshaft TW1 of the variable displacement pump VP at the speed of rotation of the drive motor AM. In this operating condition "c", apart from volumetric losses which are caused by the pressure resulting from the booster effect of the hydrostatic transmission HG in the closed circuit, the power is transmitted purely mechanically. The output speed of rotation of the planetary carrier PT equals the resulting peripheral speed uT on the planetary carrier PT. As illustrated in the diagram of the speed of travel of the vehicle, the vehicle in this operating condition "c", in which the power is transmitted purely mechanically, is in a forward direction of travel and at a specified speed of travel.

Starting from the operating condition "c", the speed of travel of the vehicle in the forward direction of travel can be increased by adjusting the variable displacement pump VP in a second control direction (opposite to the first control direction), in which the hydraulic motor HM is driven in the forward direction and the ring gear HR rotates in the same direction of rotation as the sun gear SR driven by the drive motor AM. The operating condition "d" shows an adjustment of this type of the variable displacement pump VP in the opposite, second, control direction. In operating condition "d", the variable displacement pump is adjusted to the maximum in the second control direction. The ring gear HR, which is driven by the hydraulic motor HM in the same direction of rotation as the sun gear SR, has a peripheral speed uH which is in the same direction as the peripheral speed uS of the sun gear SR. In operating condition "d", the power is transmitted both mechanically and hydrostatically. The output speed of rotation of the planetary carrier PT is the result of the peripheral speeds uS set on the sun gear SR driven by the drive motor AM and uH of the ring gear driven by the hydraulic motor HM.

Figure 8:
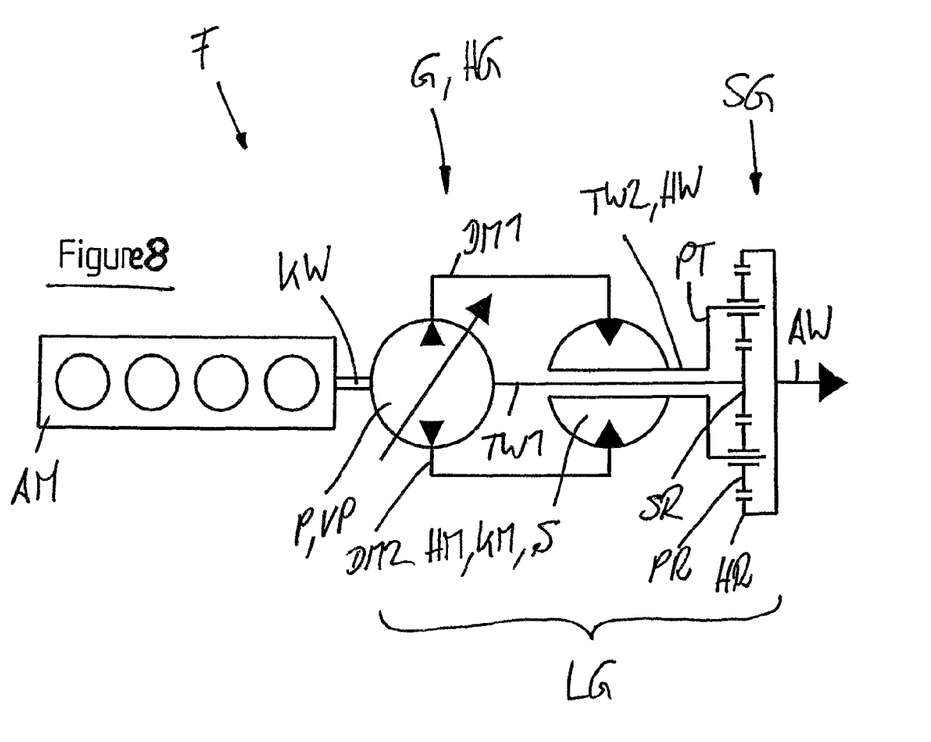
FIG. 8 shows a second embodiment of a power split transmission of the invention.

FIG. 8 shows a second embodiment of the invention in which the secondary unit S of the continuously variable transmission G is in a driving connection on the output side with the planetary carrier PT as a second drive element of the summing transmission SG (which is in the form of a planetary transmission). The ring gear HR of the summing transmission SG (which is in the form of a planetary transmission) forms the output element of the planetary transmission, which is in a driving connection with the output shaft AW. The driveshaft TW2 of the secondary unit S is in a driving connection directly and without the interposition of a clutch device with the planetary carrier PT of the summing transmission SG. The sun gear SR of the summing transmission SG is in a driving connection with the driveshaft TW1 of the primary unit P. The continuously variable transmission G in FIG. 8 is constructed, analogous to FIGS. 1-4, in the form of a compact transmission which is oriented coaxially with the output shaft KW of the drive motor AM. It goes without saying that the choice of the drive and output of the summing transmission SG in FIG. 8 can be combined with an axially parallel arrangement as illustrated in FIG. 5 and/or a deconstructed form of the continuously variable transmission G as illustrated in FIG. 6. The secondary unit S, which is shown in FIG. 8 as a constant displacement motor KM, can alternatively be in the form of a variable displacement motor VM, as illustrated in FIG. 4. The realization of the drive of the summing transmission SG by the secondary unit S and of the output of the summing transmission SG can also be applied in the exemplary embodiments illustrated in FIGS. 1-6.

The power split transmission LG of the invention makes it possible, without clutch devices in the summing transmission SG, to cover the range of the speed of travel of a vehicle (such as a motor vehicle or motorcycle) for travel in reverse and forward directions, as a result of which the power split transmission LG of the invention is highly efficient, highly energy efficient, and has a lightweight, economical and compact construction. In the power split transmission LC of the invention, the range of variation of the variable displacement pump VP in both control directions can be fully utilized, in which the proportional split in the range of variation between the speed ranges for forward travel and reverse travel correspond optimally to the driving behavior of motor vehicles or motorcycles. With the power split transmission LG of the invention, the spread of a hydrostatic transmission, which is adjusted only on the primary side and is formed by a variable displacement pump VP and a constant displacement motor KM operated in a closed circuit, can be broadened so that the full speed range and the full traction power of a conventional multispeed transmission can be covered at low displacement volumes of the variable displacement pump and of the constant-displacement motor. With a suitable design of the diameter ratios of the sun gear SR, the planetary gears PR, and the ring gear HR of the summing transmission SG (which is in the form of a planetary transmission), the range with pure mechanical power transmission (area "c" in FIG. 7) can be set in the operating range in which the vehicle is operated most of the time to further increase the overall efficiency of the vehicle.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A power split transmission of a traction drive of a vehicle,
comprising:
a continuously variable transmission comprising a primary unit and a secondary unit driven by the primary unit in both directions of rotation;
a summing transmission operatively connected to the continuously variable transmission, wherein the summing transmission comprises a planetary transmission comprising a sun gear, a ring gear, and a planetary carrier; and
a drive motor connected to the primary unit,
wherein the primary unit includes a driveshaft connected, without an interposition of a clutch device, with the sun gear of the summing transmission,
wherein the secondary unit includes a driveshaft connected, without an interposition of a clutch device, with the ring gear or the planetary carrier of the summing transmission,
wherein the planetary carrier or the ring gear of the summing transmission defines an output element of the summing transmission, which output element is connected with a wheel drive,
wherein the secondary unit and the summing transmission are oriented coaxially with the primary unit, and wherein the secondary unit is located between the primary unit and the summing transmission, and
wherein the driveshaft of the secondary unit comprises a hollow shaft, through which the driveshaft of the primary unit extends.

2. The power split transmission of claim 1, wherein the driveshaft of the primary unit is connected directly or with the interposition of a spur gear transmission with an output shaft of the drive motor.

3. The power split transmission of claim 1, wherein the driveshaft of the secondary unit is connected directly with the ring gear or the planetary carrier of the summing transmission.

4. The power split transmission of claim 1, wherein the summing transmission is oriented coaxially with the primary unit and the secondary unit is oriented axially parallel to the primary unit.

5. The power split transmission of claim 4, wherein the driveshaft of the secondary unit is connected via a spur gear transmission stage with the ring gear or the planetary carrier of the summing transmission.

6. The power split transmission of claim 1, wherein the wheel drive comprises a drive axle of a multi-track vehicle, and wherein the output element of the summing transmission is connected with a differential transmission of the drive axle.

7. The power split transmission of claim 1, wherein the wheel drive comprises an individual wheel drive of a single-track motorcycle, wherein the output element of the summing transmission is connected with a bevel gear of a bevel gear transmission that drives the individual wheel or is connected with a sprocket wheel of a chain transmission that drives the individual wheel.

8. The power split transmission of claim 1, wherein the continuously variable transmission comprises an electric transmission, and wherein the primary unit is an electric generator and the secondary unit is an electric motor.

9. The power split transmission of claim 1, wherein the continuously variable transmission comprises a mechanical continuously variable transmission selected from the group consisting of a belt transmission, a chain transmission, a friction gear, and a cone ring transmission.

10. The power split transmission of claim 1, wherein the continuously variable transmission comprises a hydrostatic transmission, and wherein the primary unit comprises a variable displacement pump and the secondary unit comprises a hydraulic motor connected in a closed circuit.

11. The power split transmission of claim 10, wherein the variable displacement pump is a bi-directionally adjustable variable displacement pump.

12. The power split transmission of claim 10, wherein the hydraulic motor comprises a constant displacement motor with a constant displacement volume.

13. The power split transmission of claim 10, wherein the hydraulic motor comprises a variable displacement motor with a variable displacement volume.

14. The power split transmission of claim 10, wherein the variable displacement pump and the hydraulic motor comprise a compact transmission in a coaxial back-to-back construction.

15. A method of operating a power split transmission of a traction drive of a vehicle including a continuously variable hydrostatic transmission and a summing transmission, the summing transmission comprising a planetary transmission comprising a sun gear, a ring gear, and a planetary carrier, with a primary unit of the continuously variable transmission including a bi-directionally adjustable variable displacement pump driven by a drive motor, and in which the variable displacement pump drives the sun gear of the summing transmission, and in which, a secondary unit of the continuously variable transmission comprising a hydraulic motor drives the ring gear of the summing transmission, and wherein the planetary carrier of the summing transmission defines an output element of the summing transmission, the method comprising:
defining a vehicle stationary setting by adjusting the variable displacement pump in a first control direction such that the hydraulic motor is driven in a reverse direction of rotation, the ring gear driven by the hydraulic motor has a direction of rotation opposite to that of the sun gear, and a peripheral speed of the sun gear and a peripheral speed of the ring gear driven by the hydraulic motor are equal.

16. The method of claim 15, further including producing a reverse direction of travel by adjusting the variable displacement pump, starting from the vehicle stationary setting, in the first control direction such that that the peripheral speed of the ring gear is greater than the peripheral speed of the sun gear.

17. The method of claim 15, further including producing a forward direction of travel by adjusting the variable displacement pump, starting from the vehicle stationary setting, toward a null position such that the peripheral speed of the ring gear is reduced, and then adjusting the variable displacement pump in a second control direction in which the hydraulic motor is driven in a forward direction such that the ring gear driven by the hydraulic motor has a direction of rotation and peripheral speed that are the same as those of the sun gear.

* * * * *

UNITED STATES PATENT AND TRADEMARK OFFICE
CERTIFICATE OF CORRECTION

| | | |
|---|---|---|
| PATENT NO. | : 9,334,939 B2 | Page 1 of 1 |
| APPLICATION NO. | : 14/100085 | |
| DATED | : May 10, 2016 | |
| INVENTOR(S) | : Lukas Krittian et al. | |

It is certified that error appears in the above-identified patent and that said Letters Patent is hereby corrected as shown below:

Title Page, Column 2, Item (57) ABSTRACT, delete "vehicle a traction" and insert -- a vehicle traction --

Claims

Column 12, Line 35, Claim 15, delete "which," and insert -- which --

Column 12, Line 52, Claim 16, delete "that that" and insert -- that --

Signed and Sealed this
Twenty-third Day of August, 2016

Michelle K. Lee
*Director of the United States Patent and Trademark Office*